Patented Mar. 28, 1939

2,151,945

UNITED STATES PATENT OFFICE 2,151,945

PHENOLIC RESINS

James E. Symonds, Mount Vernon, N. Y.

No Drawing. Application July 31, 1936,
Serial No. 93,615

6 Claims. (Cl. 260—57)

This invention relates to improvements in transparent cast phenolic resins and includes improvements in methods of producing such resins and the new resin products so produced. More particularly the invention relates to the production of transparent cast phenolic resins which are insoluble and infusible, which possess marked toughness and mechanical strength, which can be easily machined, which take a high polish, which will stand repeated heating by plunging into hot water and then chilling in colder water, and which, due wholly or in part to the fact that they are virtually anhydrous, do not tend to develop cracks or flaws in the course of time.

The process of the present invention, moreover, enables such improved transparent cast phenolic resins to be produced without the intermediate production of a gel or without first going through the "gel" stage during their production.

According to the present invention there is first prepared an anhydrous liquid condensation product from phenol or its homologues and from anhydrous aldehydes such as trioxymethylene with the use of from about two to three methylene or ethylene groups for each phenol group. This liquid anhydrous condensation product is prepared either in the presence or absence of a basic catalyst, or in the presence of an insoluble catalyst which does not enter into combination with the resin. This liquid anhydrous condensation product is treated with a regulated amount of a suitable organic acid and advantageously also with glycerin, and subsequently heated in molds to form the final product.

The invention will be further illustrated by the following more detailed description, but it will be understood that the invention is not limited thereto.

As an example of the process, 100 parts by weight of phenol are melted in a suitable kettle which is provided with a jacket, a stirring device, and a connection to a vacuum pump, and, to the melted phenol there is added about 60 parts by weight of trioxymethylene and the temperature is raised to about 53° C., while stirring vigorously, until the mixture becomes a uniform, creamy liquid, free from any sizable lumps.

To this creamy liquid there is then added from 0.1 to 0.16 part by weight of caustic soda dissolved in the smallest possible quantity of water. The temperature will rise owing to the exothermic reaction that takes place. At this same time the heat is shut off and the cold water is turned into the jacket of the kettle so that the temperature is held preferably at about 65° C. but in no case permitted to go above 72° C. The whitish appearance of the mixture in the kettle changes to yellow. A further and similar amount of caustic soda is added in like manner and with constant agitation and the temperature is held below 72° C. and preferably at about 65° C. for e. g. about one hour, when a further and similar addition of caustic soda is made, making the total amount of caustic soda about 0.3 to 0.5 part by weight. The reaction is continued under atmospheric pressure and with maintenance of the temperature at about 75° C. for a period e. g. of about three hours at which time the liquid will be quite clear and the exothermic reaction will have subsided somewhat. At no time is there a separation or segregation of the mass into layers.

The heating or reaction is then continued under reduced pressure, by the application of a vacuum to the kettle, and while holding the temperature at around 75° C. for a period e. g. of about five hours until the liquid product is free or practically free from water. The product made in this way is quite fluid so that under the reduced pressure the water present in the liquid condensation product can readily escape so as to leave an anhydrous, liquid condensation product.

To the liquid, anhydrous condensation product thus produced there is added a sufficient amount of a suitable organic acid to neutralize the caustic soda and to give an excess of about 1% of acid on the condensation product. As suitable organic acids may be mentioned acetic, formic and lactic acids, with acetic acid as the preferred and in general more advantageous acid. The heating is continued under reduced pressure while maintaining a temperature around 75° C. for a further period e. g. of three hours. There is then added from 10 to 20%, based upon the condensation product, of glycerin which has been freed from water by heating it at 100° C. and under a reduced pressure until it is quite anhydrous.

The complete mixture is then heated further, until the product is thickened to the desired degree, due to polymerization, thus giving a product capable of being poured or cast in molds and subsequently further hardened.

To obtain the transparent final product the liquid anhydrous resin, produced as above described, is transferred to suitable molds and placed in a curing oven to harden. This hardening can be accomplished for example by pouring the still liquid resin into suitable molds, placing them in the oven which is kept at a temperature of about 60° C. long enough to permit any entrapped air to escape, and then gradually raising the temperature over a period of e. g. 24 hours to around 90° C. and allowing it to remain until the desired hardness is obtained. The molds containing the resin are then removed from the oven, allowed to cool, and the molded resin removed from the molds. To produce a final insoluble and infusible transparent product, a period of e. g. around 92 hours may be required for the curing or hardening in the oven.

Variations can be made in the process to produce somewhat different properties in the product. For example, suitable dyes can be added to the liquid condensation product to give any desired tint or color to the final product. If colorless transparent products are required, the phenols should be of suitable purity and the methylene groups are advantageously increased up to 3 methylene groups to 1 phenol group, instead of using about 2 methylene groups for each phenol group. Where the phenol is impure or has a distinct color, this influences the color of the final product.

While trioxymethylene is referred to in the preceding specific illustration of the process, other anhydrous polymers of aldehydes can be used such as paraldehyde or metaldehyde, sufficient of the polymerized aldehyde being employed to give a hard final product without materially changing the desirable mechanical qualities of the product.

The degree of toughness of the product can be modified by reducing or increasing the amount of glycerin. The product can be made without glycerin, but a tougher and for various purposes more valuable product is obtained when glycerin is used. Also other materials may be admixed in making the resins such as for example triphenyl-phosphate or tricresyl-phosphate as a plasticizer. Suitable dyes can also be added to give any desired tint, as previously described.

The present invention provides an improved method of making valuable transparent cast phenolic resins which present advantages in their properties, such as those hereinbefore pointed out. The final products, made with the use of an acid, are neutral in character.

I claim:

1. The method of making transparent cast phenolic resins which comprises preparing a liquid substantially anhydrous condensation product by the reaction of a substantially anhydrous mixture of a phenol and a polymeric formaldehyde in the proportions of about two to three methylene groups for each phenol group, said condensation product being prepared by a method which includes the step of heating the same at reduced pressure until the condensation product is substantially anhydrous, adding to said liquid substantially anhydrous condensation product a small percentage of an organic acid sufficient in amount to render the product slightly but distinctly acidic, heating the resulting acidic product for about three hours under reduced pressure at about 75° C. to effect further condensation and form a condensation product which is liquid and substantially anhydrous, introducing such condensation product into molds, and curing the same by prolonged heating.

2. The method of making transparent cast phenolic resins which comprises preparing a liquid substantially anhydrous condensation product by the reaction of a substantially anhydrous mixture of a phenol and a polymeric formaldehyde in the proportions of about two to three methylene groups for each phenol group, said condensation product being prepared by a method which includes the step of heating the same at reduced pressure until the condensation product is substantially anhydrous, adding to said liquid substantially anhydrous condensation product a small percentage of an organic acid sufficient in amount to render the product slightly but distinctly acidic, heating the resulting acidic product for about three hours under reduced pressure at about 75° C. to effect further condensation and form a condensation product which is liquid and substantially anhydrous, admixing anhydrous glycerin with the resulting condensation product and heating the mixture until it is thickened to the desired degree, introducing such glycerin treated product into molds, and curing the same by prolonged heating.

3. The method of making transparent cast phenolic resins which comprises forming a substantially anhydrous mixture of a phenol and a polymeric formaldehyde in the proportions of about two to three methylene groups for each phenol group, adding successive portions of caustic soda to the phenol-aldehyde mixture at a temperature below about 72° C. until a total of about 0.3 to 0.5% caustic soda on the weight of the phenol has been added, heating said mixture after the addition of all the caustic soda for about three hours at about 75° C. to form an initial condensation product, thereafter heating the mixture under reduced pressure at a temperature of about 75° C. for about five hours to obtain a substantially anhydrous liquid condensation product, adding to said product a small percentage of organic acid sufficient in amount to neutralize the caustic soda and give an excess of about 1% acid on the weight of the product, heating the resulting acidic product for about three hours under reduced pressure at about 75° C. to effect further condensation and form a condensation product which is liquid and substantially anhydrous, admixing anhydrous glycerin with the resulting condensation product and heating the mixture until it is thickened to the desired degree, introducing such glycerin treated product into molds, and curing the same by prolonged heating.

4. The method of making transparent cast phenolic resins which comprises forming a substantially anhydrous mixture of phenol and trioxymethylene in the proportion of about two to three methylene groups for each phenol group, adding successive portions of caustic soda to the phenol-trioxymethylene mixture at a temperature below about 72° C. until a total of about 0.3 to 0.5% caustic soda on the weight of the phenol has been added, heating said mixture after the addition of all the caustic soda for about three hours at about 75° C. to form an initial condensation product, thereafter heating the mixture under reduced pressure at a temperature of about 75° C. for about five hours to obtain a substantially anhydrous liquid condensation product, adding to said product a small percentage of organic acid sufficient in amount to neutralize the caustic soda and give an excess of about 1% acid on the weight of the product, heating the resulting acidic product for about three hours under reduced pressure at about 75° C. to effect further condensation and form a condensation product which is liquid and substantially anhydrous, then adding from 10 to 20% of anhydrous glycerin based on the weight of the condensation product and heating to effect further condensation until the mixture is thickened to the desired degree, introducing such glycerin treated product into molds, and curing the same by prolonged heating.

5. Cast phenolic resins produced in accordance with the process of claim 1.

6. Cast phenolic resins produced in accordance with the process of claim 2.

JAMES E. SYMONDS.